United States Patent [19]
Laudon et al.

[11] Patent Number: 5,991,895
[45] Date of Patent: Nov. 23, 1999

[54] SYSTEM AND METHOD FOR MULTIPROCESSOR PARTITIONING TO SUPPORT HIGH AVAILABILITY

[75] Inventors: James P. Laudon, Menlo Park; Daniel E. Lenoski, San Jose, both of Calif.

[73] Assignee: Silicon Graphics, Inc., Mountain View, Calif.

[21] Appl. No.: 08/435,462

[22] Filed: May 5, 1995

[51] Int. Cl.[6] .................................................. G06F 11/00
[52] U.S. Cl. ............................................. 714/8; 711/163
[58] Field of Search .................................... 395/490, 181, 395/800, 800.01, 182.06, 182.08; 714/8, 10; 711/152, 163; 70/40, 244

[56] References Cited

U.S. PATENT DOCUMENTS

| | | | |
|---|---|---|---|
| 3,812,469 | 5/1974 | Hauck et al. | 395/280 |
| 5,280,606 | 1/1994 | Jippo et al. | 395/181 |
| 5,396,609 | 3/1995 | Schmidt et al. | 395/490 |
| 5,414,856 | 5/1995 | Yokota | 395/728 |
| 5,481,747 | 1/1996 | Kametani | 395/800 |
| 5,598,562 | 1/1997 | Cutler et al. | 395/674 |

OTHER PUBLICATIONS

J. Kuskin, et al., "The Stanford Flash Multiprocessor," *Proceedings of the 21st. Intl. Symposium on Computer Architecture*, pp. 302–313, Apr. 1994.

*Primary Examiner*—John A. Follansbee
*Attorney, Agent, or Firm*—Sterne, Kessler, Goldstein & Fox PLLC

[57] ABSTRACT

A system and method for partitioning to support high availability of a multiprocessor system. The system comprises a plurality of masters, including processors, input/output devices, or the like, and is divided into regions. Per-region access rights are assigned to the system resources. The regions are grouped into partitions, wherein a partition is a portion of the system that is treated as a single unit with respect to failure. Failure of a master in a given region only affects resources accessible to that given region. Per-region access can be to main memory on a per-page basis, for example. Alternatively, the per-region access can limit access to directory storage, input/output ports and devices, control or diagnostics registers.

20 Claims, 3 Drawing Sheets

SYSTEM AND METHOD FOR MULTIPROCESSOR PARTITIONING TO SUPPORT HIGH AVAILABILITY

CROSS-REFERENCE TO RELATED APPLICATIONS

The following are related, commonly owned, co-pending applications:

Directory-Based Coherence Protocol Allowing Efficient Dropping of Clean-Exclusive Data, U.S. patent application Ser. No. 08/435,460 filed on May 5, 1995, now U.S. Pat. No. 5,680,576 (Attorney Docket No. 1452.0620000/15-4-192.00); and Cache Coherency Using Flexible Directory Bit Vectors, U.S. patent application Ser. No. 08,435,463 filed on May 5, 1995, now U.S. Pat. No. 5,634,110 (Attorney Docket No. 1452.0710000/15-4-204.00). The disclosures of the above applications are incorporated herein by reference.

BACKGROUND OF THE INVENTION

1. Field of the Invention

The present invention relates generally to multiprocessor computer systems, and more particularly, to a system and method for partitioning to support high availability of system resources.

2. Related Art

A distributed computer system typically includes a plurality of processing nodes each having one or more processors, a cache connected to each processor, and main memory that can be accessed by any of the processors. The main memory is physically distributed among the processing nodes. In other words, each processing node includes a portion of the main memory. At any time, data elements stored in a particular main memory portion can also be stored in any of the caches existing in any of the processing nodes.

As multiprocessors become larger and larger, the probability of a hardware failure increases due to the increased number of components in the system. In addition, software and hardware failures can cause a large number of processors to be unavailable. It is desirable that the effects of software or hardware failure be contained to a subset of the entire system, thus allowing the multiprocessor to be more highly available.

Access rights have been used for years by software to protect resources. However, access rights have not been commonly used to protect hardware resources in an effort to improve hardware availability. The Stanford FLASH implemented a single bit in its memory directory to protect sections of memory (see, J. Kosjin et al., *The Stanford FLASH Multiprocessor,* Proceeding of the 21st International Symposium on Computer Architecture,pg. 302–313, April 1994). However, this scheme of protection only supported the concept of "us versus them." Only intra-partition communications is protected by such a scheme. Communications between two partitions cannot be protected because once inter-partition communication begins, a third partition can access and corrupt any resource associated with either of the two communicating partitions.

Thus, what is required is an improved partitioning system that results in minimal, if any, system performance degradation, and requires minimal directory storage overhead while supporting high availability of system resources.

SUMMARY OF THE INVENTION

The present invention is directed to a system and method for partitioning to support high availability of a multiprocessor system's resources. The present invention permits multiple operating system kernels to run on a single multiprocessor system at the same time, because of the protection afforded by the partitioning.

The system comprises a plurality of masters, including processors, input/output devices, or the like, and is divided into regions. Per-region access rights to the system resources are assigned to the masters. Masters are grouped in regions that are assigned to partitions, wherein a partition is a portion of the system that is treated as a single unit with respect to failure. Upon failure of a master in a given region, masters in other partitions can determine which resources could have been corrupted, damaged, or otherwise made unavailable due to operations by the failing master. Failure of the master can be hardware or software based. Only those masters with access rights to the partition associated with that region are affected by the failure.

The per-region access can be to main memory on a per-page basis, for example. Alternatively, the per-region access can be to limit access to directory storage, input/output (I/O) ports and devices, control registers or diagnostics routines.

Also, per-region access can be divided into a plurality of levels of access. In a preferred embodiment, the per-region access provides three levels of access, comprising the levels of no access, read-only access, and read-write access.

In a further embodiment of the present invention, messages from masters are stamped with identifiers to specify the master that is requesting access to a resource. The identifiers of the master are mapped to the regions for specifying whether the associated master has access to a given region. A controller associated with the resource to which a message is directed can determine the access rights of a requesting master by comparing the message's identifier to the resource's mapping of identifiers. Based on the access rights, the controller can act on the message or return an access denied response to the requesting master.

In a still further embodiment of the present invention, a master without access rights to a given region can modify its own access bit vector to gain special access.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein.

DETAILED DESCRIPTION OF THE PREFERRED EMBODIMENTS

Figure 1:
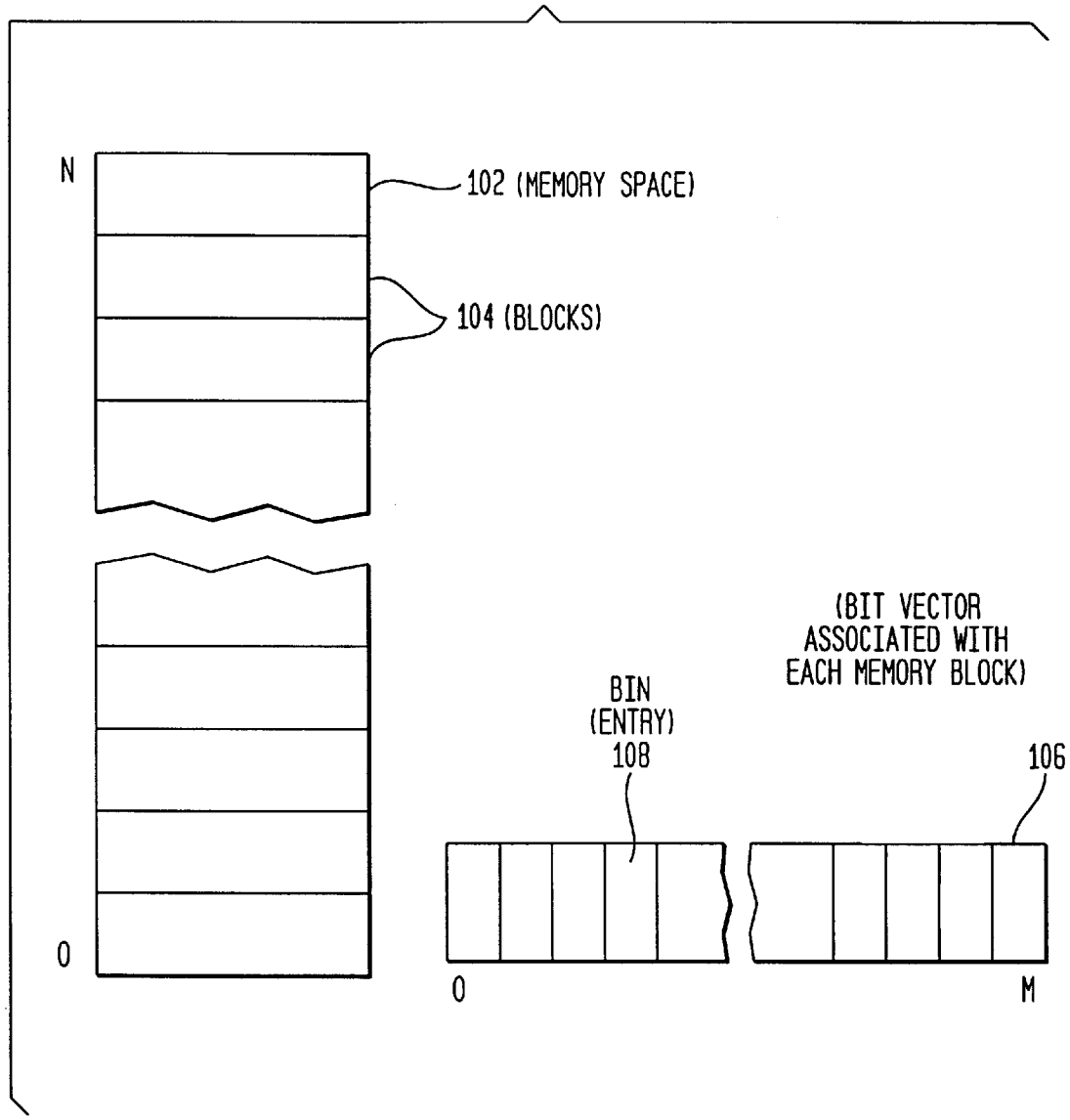
FIG. 1 is a schematic diagram of a portion of main memory and a corresponding access bit vector according to the present invention.

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the invention.

The preferred embodiment of the invention is now described with reference to the figures where like reference numbers indicate identical or functionally similar elements. Also in the figures, the left most digit of each reference number corresponds to the figure in which the reference number is first used.

The inventors have reduced to practice a hardware-, firmware-, or software-managed mechanism for allowing access to resources within a system to be restricted to a subset of the total processes running on the system. This is done by associating each master (e.g., a processor, an input/output (I/O) device, or the like) with a particular region and providing per-region access rights to all resources in the system. A region is the smallest granularity that the access-enforcing mechanism can distinguish between requesters (also called masters).

A controller in the form of hardware, firmware, software or a combination thereof, is used to group the regions into partitions, where a partition is a portion of the system that is treated as a single unit with respect to failure. In other words, one or more regions are mapped to a single partition. If a failure occurs with respect to that partition, only those masters having access rights to the resources of the regions mapped to that partition will be affected by the failure within the partition. Additionally, masters not affected by the failure can readily determine which of their resources, if any, could have been corrupted, damaged, or otherwise made unavailable due to the failure.

The granularity of the resource at which these access rights are provided depends on the resource being protected. Memory can be protected on a per-page basis, where a page is an object of a consistent size, ranging from a cache line to an entire memory portion and is therefore implementation dependent. Other resources that can be protected according to access rights in accordance with the present invention are I/O devices, control registers, and the diagnostic hardware resources, or the like. Other protectable resources would be apparent to a person skilled in the relevant art.

The main advantage of the present invention is that partitioning permits the masters not affected by a failure to determine what resources could have been corrupted, damaged, or otherwise made unavailable due to the failure. Because of partitioning, and the mapping of regions to partitions, the failure of a resource within a particular region can be communicated or otherwise made available to masters throughout the multiprocessing system. By scanning what is called an "access bit vector," each master not affected by a given failure can identify which of its resources might be affected and in need of recovery.

This advantage of the present invention can be understood by way of example. In a system in which two regions share a page of memory and which a third region does not have access rights to, upon a failure in the third region the system can determine that there is no problem with the data in the page shared by the first two regions, as well as future access to that page by other regions having access to it. In this example, an interrupt handler, or the like, can check access bit vectors to determine that the third region did not have access rights to that page of memory. Thus, that page could not have been affected by the failure in the third region, regardless of the nature (e.g., hardware or software) of the failure.

The functionality performed by the interrupt handler discussed in the preceding example can be carried out by a single system controller, or the operation may be distributed to memory controllers throughout the system. Furthermore, implementation of such functionality using the access bit vector to determine access rights or consequences of a resource failure can be implemented in many ways, without departing from the scope of the present invention.

FIG. 1 is a representative example of a access bit vector for main memory. In this example, main memory 102 is represented in memory space from blocks 0 to N. These 0 to N blocks are shown generally at 104. A access bit vector 106 is associated with each memory block 104. Each access bit vector 106 is M bits in length. Each bit 108 of the access bit vector 106 represents an entry or "bin." Each master in the multiprocessor system is assigned a bin number. This assignment can be predetermined or can be programmable by system software. Multiple masters can be mapped to a single bin number. If an access bit vector bit is set (i.e., has a value of logical "1") the master(s) corresponding to that bin has access to the resource to which that access bit vector bit corresponds. Alternatively, if the bit in that bin is not set (i.e., has a value of logical "0") the master(s) corresponding to that bin does not have access to the corresponding resource.

According to the present invention, a bit 108 of the access bit vector 106 is associated with each master in a multiprocessor system. Masters can include microprocessors (also called processors), I/O devices, or the like. The access bit vectors 106 can then be used for restricted access to system resources such as main memory, I/O ports, control registers, diagnostic resources, or the like, as would be apparent to a person skilled in the relevant art.

Figure 2:
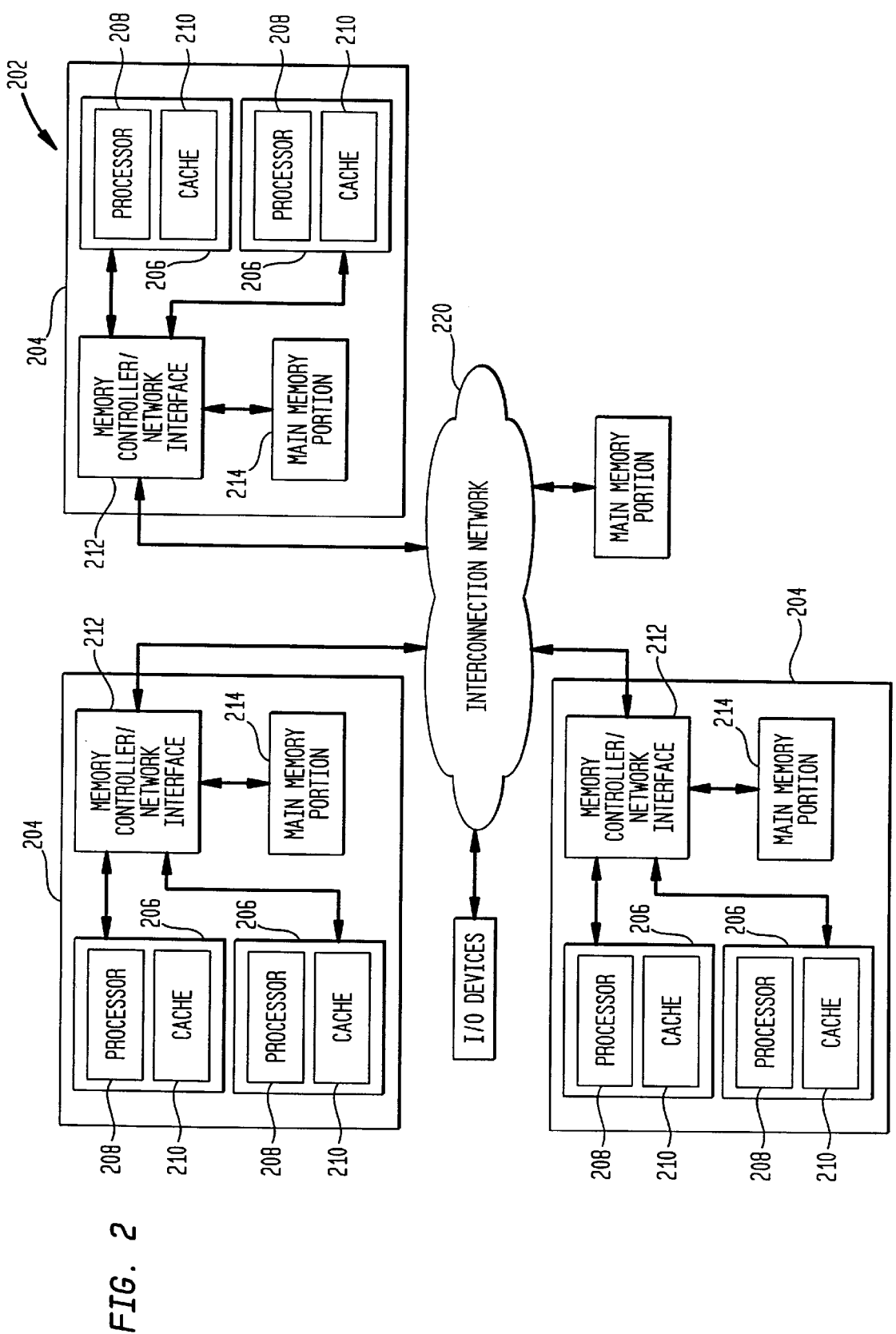
FIG. 2 is a block diagram of a distributed computer system according to a preferred embodiment of the present invention.

An exemplary block diagram of a distributed computer system 202 according to a preferred embodiment of the present invention is shown in FIG. 2. The distributed computer system 202 is preferably a distributed, non-uniform memory access (NUMA) computer system. The computer system 202 includes a plurality of processing nodes 204 (preferably 512 processing nodes 204), which are physically distinct and physically separated from one another. The processing nodes 204 communicate with each other over a communication network 220, representing a well-known data communication means, such as a bus, multistage interconnect network, local area network, wide area network, etc., or any combination of these. Various I/O devices 225 are also shown at various example locations in the system.

Each processing node 204 includes one or more computing nodes 206 (preferably, each processing node 204 includes two computing nodes 206). Each computing node 206 includes a processor 208 and a cache 210. Each processing node 204 also includes a memory controller and network interface 212. The processors 208 in any particular processing node 204 communicate with other devices connected to the communication network 220 via the memory controller and network interface 212 contained in that processing node 204. Each processing node 204 also includes a portion of main memory 214. The portions of main memory 214 in all of the processing nodes 204 collectively represent the main memory 102 of the computer system 202. Any processor 208 in any processing node 204 can access data stored in the portion of main memory 214 contained in any other processing node 204. Access to data contained in the portion of main memory 214 of any particular processing node 204 is controlled by the memory controller and network interface 212 contained in that same processing node 204, but is limited by the partitioning scheme in accordance with the present invention.

At any time, data elements stored in any main memory portion 214 can also be stored in any of the caches 210 existing in the processing nodes 204. Each processing node 204 includes a directory-based cache coherency mechanism (not shown) to maintain the coherency of data stored in its main memory portion 214. The cache coherency mechanism preferably forms part of the memory controller and network interface 212 in the processing node 204. Similarly, partitioning, according to the present invention, is also managed by the memory controller and network interface 212.

A preferred embodiment of the directory-based protocol implemented by the memory controller and network interface 212 is described in commonly-owned, copending U.S. patent application Ser. Nos. (Attorney Docket Nos. 1452.0710000/15-4-204.00, and 1452.0620000/15-4-192.00).

According to a preferred embodiment of the present invention, the computer system 202 includes a plurality of partitions each comprising one or more processing nodes 204. Preferably, the system includes 64 partitions, and each partition includes eight processing nodes 204. However, the invention works equally well with different numbers of partitions and different numbers of processing nodes 204 per partition.

The present invention facilitates system expandability. If the computer system 204 has less than 64 processing nodes 202, then the access bit vector can be changed accordingly. In one embodiment of the invention, critical parameter information such as the number of processing nodes 204, the number of partitions, the number of nodes 204 in each partition, the size of access bit vector, etc., are stored in software adjustable tables, thereby further enhancing and facilitating expandability.

Figure 3:
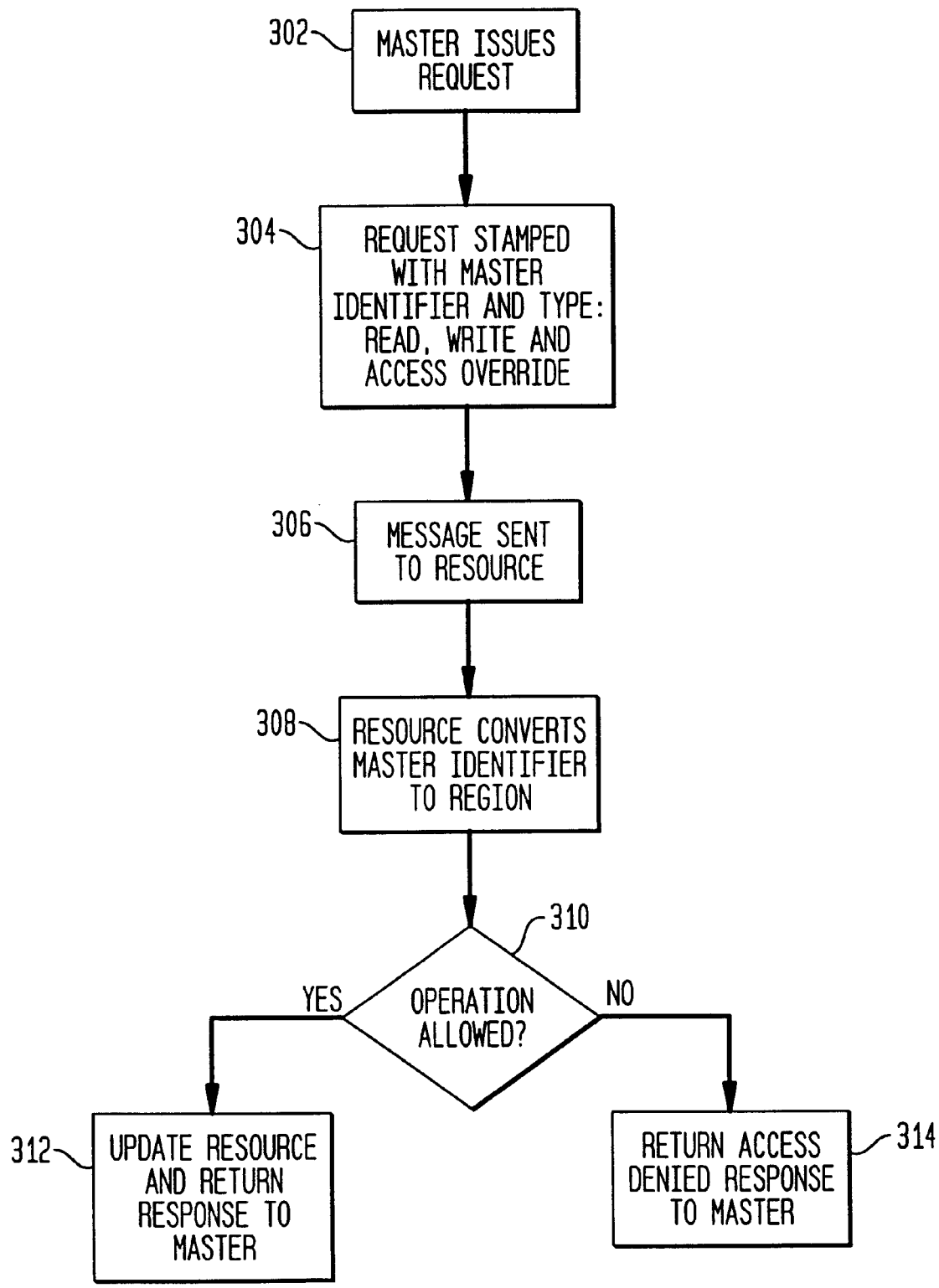
FIG. 3 is a state diagram representing the operation of the present invention.

FIG. 3 shows a state diagram representing the operation of determining access rights according to a preferred embodiment of the present invention. First, a master issues a request, as shown at a step 302. The master's request is then stamped with a master identifier and is typed as a read or write operation, as shown at a step 304. The stamping operation can be performed by the memory controller and network interface 212.

The message is then sent to the resource, at a step 306. Once the message is received at the resource, the resource converts the master identifier to the region associated with the master making the request, as shown at step 308. As noted above, masters are mapped to bins in the access bit vector, and multiple masters can be mapped to a single bin number. Access rights are then checked, as shown at step 310. If the region associated with the master has access rights to the resource, as shown at step 312, the resource is updated and a response is returned to the master. Alternatively, if the operation is not allowed, an access denied response is returned to the master, as shown at step 314.

Additionally, access rights can be separated into a plurality of levels. According to a preferred embodiment of the present invention, there are three levels of access: no access, read-only access, and read-write access. If a master has no access, it cannot read or modify the resource. If a master has read-only access, it can read, but not modify the resource. Finally, if a master has read-write access, it can read and modify the resource.

According to the preferred embodiment of the present invention, all masters are mapped into 64 hardware-supported regions by a two-level scheme. First, all the masters (e.g., processors or I/O devices) on a given node are lumped into the same partition region. Second, the high-order bits of the node identifier are used to map the master to the 64 regions. According to this embodiment, memory access rights are stored on a per-4K (kilobyte) page basis. These access rights are stored in the same memory as the directory, and are accessed in parallel with reading/writing memory, thereby adding no time overhead when the memory operation was not to protected memory. Similarly, the protection scheme for directory storage itself, as well as I/O ports, control registers, and the like, are protected using a 64-bit register that represents no access or read-write access for each region using one bit to represent each region.

In a still further embodiment of the present invention, the memory controller and network interface 212 can service access override messages from masters not having access rights per se. If enabled for a given resource, a message marked "access override" can receive access to a resource on a message-by-message basis. In the preferred embodiment, only access protection vector registers all "access override" that can then be used to get diagnostic access to all resources.

The system can include a partitioning controller, or the like, that can comprise means for permitting a master without access rights to modify its own access bit vector to gain access override. Alternatively, masters without access rights can be configured to modify their own access bit vector to gain access override. The probability of a failing master to inadvertently modify its own access rights to a region and then corrupt that region is highly unlikely.

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents. All cited patent documents and publications in the above description are incorporated herein by reference.

What is claimed is:

1. A method for partitioning to support high availability of a multiprocessor system having a plurality of masters and system resources, comprising the steps of:

storing per-region access rights for each of the system resources, wherein the multiprocessor system resources are divided into regions, and said per-region access rights for a given system resource specify which of plurality of masters have access rights to said given system resource;

receiving a message from one of the plurality of masters at one of the system resources, said message having an identifier specifying said one of the masters;

determining whether said one of the plurality of masters has access rights to said one of the system resources by comparing said identifier to said per-region access rights; and mapping said regions to partitions wherein each partition comprises at least one of said regions;

wherein upon failure of any of the plurality of masters of a given partition, only those masters having access rights to said resources of said regions mapped to that partition will be affected by said failure.

2. The method according to claim 1, further comprising the step of providing per-region access to main memory.

3. The method according to claim 2, further comprising the step of providing per-region access to main memory on a per-page basis.

4. The method according to claim 1, further comprising the step of providing per-region access to directory storage.

5. The method according to claim 1, further comprising the step of providing per-region access to input/output ports.

6. The method according to claim 1, further comprising the step of providing per-region access to control and diagnostics registers.

7. The method according to claim 1, further comprising the step of dividing said per-region access rights into a plurality of levels of access.

8. The method according to claim 7, further comprising the step of dividing said per-region access rights into three levels of access, comprising the levels of no access, read-only access, and read-write access.

9. The method according to claim 1, further comprising the steps of receiving a message from one of the plurality of masters at one of the resources, said message having an identifier specifying said one of the plurality of masters;

mapping, at said one of the system resources, said identifier into one of said regions;

determining the access rights of said region; and based on said determined access rights, performing one of acting on said message or returning an access denied response.

10. The method according to claim 9, further comprising the step of permitting one of the plurality of masters without access rights to modify an access bit vector for a given resource to gain access override to said given resource.

11. The method according to claim 1, further comprising the step of granting access to one of the plurality of masters without access rights if said master requests access override to said given resource.

12. In a multiprocessor system having a plurality of masters and system resources, a partitioning controller for supporting high availability of the system resources, comprising:

first means for storing per-region access rights for each of the system resources, wherein the multiprocessor system resources are divided into regions, and said per-region access rights for a given system resource specify which of the plurality of masters have access rights to said given system resource;

second means, responsive to said first means, for receiving a message from one of the plurality of masters at one of the system resources, said message having an identifier specifying said one of the plurality of masters;

third means, responsive to said second means, for determining whether said one of the plurality of masters has access rights to said one of the system resources by comparing said identifier to said per-region access rights; and fourth means, for mapping said regions to partitions, wherein each partition comprises at least one of said regions;

wherein upon failure of any of the plurality of masters of a given partition, only those masters having access rights to said resources of said regions mapped to that partition will be affected by said failure.

13. The controller according to claim 12, further comprising means for providing per-region access to a main memory.

14. The controller according to claim 13, further comprising means for providing per-region access to a main memory on a per-page basis.

15. The controller according to claim 12, further comprising means for providing per-region access to directory storage.

16. The controller according to claim 12, further comprising means for providing per-region access to input/output port access.

17. The controller according to claim 12, further comprising means for providing per-region access to control and diagnostics registers.

18. The controller according to claim 12, further comprising means for dividing said per-region access rights into a plurality of levels of access.

19. The controller according to claim 18, further comprising means for dividing said per-region access rights into three levels of access, comprising the levels of no access, read-only access, and read-write access.

20. The controller according to claim 12, further comprising means for permitting one of the plurality of masters without access rights to modify an access bit vector for a given resource to gain access override to said given resource.

* * * * *